United States Patent
Exenberger et al.

(10) Patent No.: US 9,748,693 B1
(45) Date of Patent: Aug. 29, 2017

(54) CONNECTOR POSITION ASSURANCE WITH IDENTIFICATION FEATURE

(71) Applicant: YAZAKI NORTH AMERICA, INC., Canton, MI (US)

(72) Inventors: Richard Joseph Exenberger, Plymouth, MI (US); Brian L. Wagner, Ypsilanti, MI (US)

(73) Assignee: YAZAKI NORTH AMERICA, INC., Canton, MI (US)

(*) Notice: Subject to any disclaimer, the term of this patent is extended or adjusted under 35 U.S.C. 154(b) by 0 days.

(21) Appl. No.: 15/040,716

(22) Filed: Feb. 10, 2016

(51) Int. Cl.
*H01R 13/62* (2006.01)
*H01R 13/629* (2006.01)
*H01R 13/641* (2006.01)

(52) U.S. Cl.
CPC ..... *H01R 13/62977* (2013.01); *H01R 13/641* (2013.01)

(58) Field of Classification Search
CPC ........ H01R 13/62933; H01R 13/62938; H01R 13/62955; H01R 13/62988; H01R 13/641
USPC ........................................ 439/157, 372, 489
See application file for complete search history.

(56) References Cited

U.S. PATENT DOCUMENTS

| | | | |
|---|---|---|---|
| 6,077,101 A | 6/2000 | Garretson et al. | |
| 6,319,050 B1 | 11/2001 | Miyazaki et al. | |
| 6,475,004 B2 | 11/2002 | Shuey et al. | |
| 6,824,406 B1 | 11/2004 | Sharples et al. | |
| 6,881,081 B2 | 4/2005 | Gundermann et al. | |
| 7,004,769 B1 | 2/2006 | Putnam et al. | |
| 7,137,844 B2 * | 11/2006 | Flowers | H01R 13/5812 439/372 |
| 7,175,451 B2 | 2/2007 | Shuey | |
| 7,223,130 B2 | 5/2007 | Osada et al. | |
| 7,361,036 B2 | 4/2008 | Pittenger et al. | |
| 7,384,285 B2 | 6/2008 | Patterson et al. | |
| 7,559,778 B2 | 7/2009 | Pittenger et al. | |
| 7,563,114 B2 | 7/2009 | Patterson | |
| 7,695,297 B2 | 4/2010 | Pittenger et al. | |
| 7,922,504 B2 * | 4/2011 | Sakamaki | H01R 13/4361 439/157 |
| 8,282,411 B2 | 10/2012 | Itzenhuiser et al. | |
| 8,678,846 B2 | 3/2014 | Hitchcock et al. | |
| 8,784,127 B2 | 7/2014 | Bashkin et al. | |
| 8,882,521 B2 | 11/2014 | Conway et al. | |
| 2003/0109155 A1 | 6/2003 | Yamashita | |
| 2004/0192090 A1 | 9/2004 | Flowers et al. | |

(Continued)

FOREIGN PATENT DOCUMENTS

JP 2009-243770 10/2009
KR 101479054 B1 1/2015

OTHER PUBLICATIONS

Extended European Search Report for EP App. No. 17155307.6, dated Jun. 8, 2017, 10 pages.

*Primary Examiner* — Hae Moon Hyeon
(74) *Attorney, Agent, or Firm* — Foley & Lardner LLP

(57) ABSTRACT

A connector assembly comprises a first housing, a second housing, a machine readable identifier coupled to the second housing, and a position assurance lock disposed proximate to the second housing. The position assurance lock is configured to secure the first housing to the second housing and place the machine readable identifier in a first state or a second state, depending on whether the first housing is secured to the second housing.

20 Claims, 5 Drawing Sheets

(56) References Cited

U.S. PATENT DOCUMENTS

2005/0106911 A1    5/2005  Sharples et al.
2014/0099807 A1*   4/2014  Hotea .................... H01R 13/44
                                                    439/131
2015/0295352 A1    10/2015 Kim et al.

* cited by examiner

CONNECTOR POSITION ASSURANCE WITH IDENTIFICATION FEATURE

TECHNICAL FIELD

The present application relates generally to the field of connectors. In particular, the embodiments of the present invention relate to a device and method for ensuring a secure connection of a connector assembly.

BACKGROUND

A connector assembly may sometimes include a lever configured to mate each respective housing of the connector assembly. In some applications, the lever may be rotated to connect the two housings. The connection can be unreliable in that, often times, the lever is not pushed through the entire range of motion (e.g., not pushed into the connected position). Such improperly mated connector assemblies are susceptible to movement which may be caused by vibration of the connector assembly. This vulnerability is usually not apparent to an operator, resulting in erroneous determinations that the connector assembly is properly mated. Thus, an ongoing need exists for improved designs that allow for a reliable determination of the connection status of such connector assemblies.

SUMMARY OF THE INVENTION

In an example embodiment, the connector assembly comprises a first housing, a second housing, a machine readable identifier coupled to the second housing. The connector assembly further comprises a position assurance lock disposed proximate to the second housing. The position assurance lock is configured to secure the first housing to the second housing and place the machine readable identifier in a first state or a second state, depending on whether the first housing is secured to the second housing.

In another example embodiment, a method of conveying a secure connection status corresponding to a connector assembly comprises connecting, by a lever component, a first housing to a second housing, moving, by the lever component, from a first position to a second position, securing, by a position assurance lock configured to move from a disengaged position to an engaged position, switching the machine readable identifier from an inaccessible state to an accessible state responsive to the position assurance lock moving from the disengaged position to the engaged position, and conveying a secure connection status corresponding to the first housing and the second housing in response to an electronic contact applied to the machine readable identifier.

These and other features of the implementations described herein, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Figure 1:
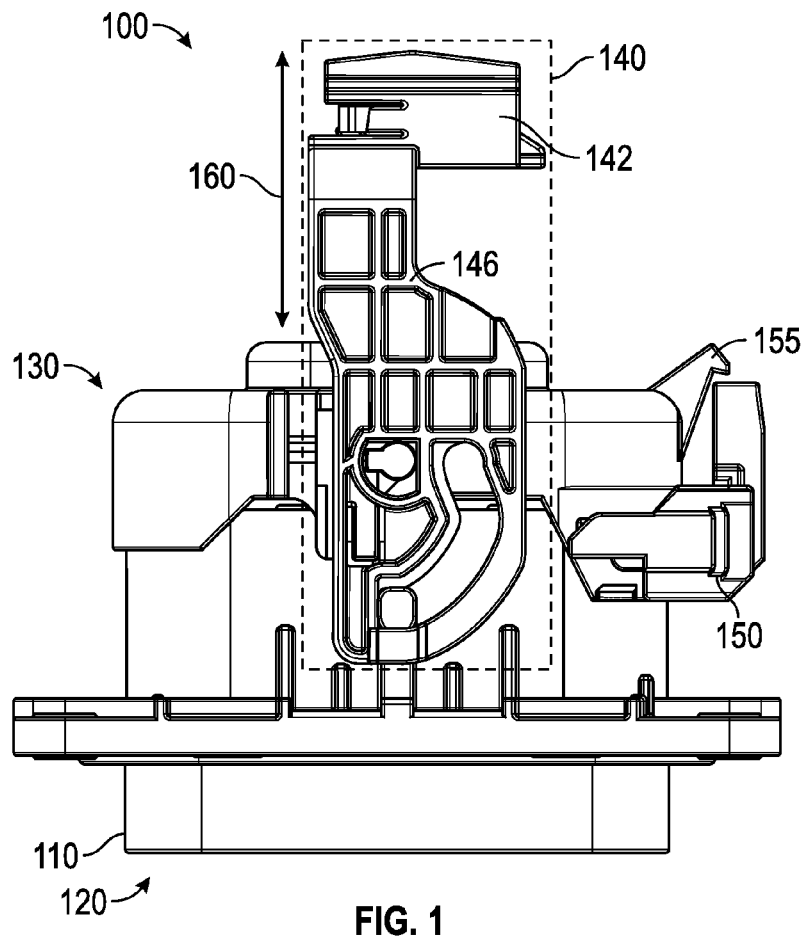
FIG. 1 illustrates a side perspective view of a connector assembly in a first position according to an example embodiment.

Referring to the figures generally, an apparatus (e.g., a connector assembly 100) that includes a mechanism for determining a secure connection status is described. FIG. 1 illustrates a side perspective view of a connector assembly 100 in a first position 160 according to an example embodiment. The connector assembly 100 may include a first housing 120 comprising a base 110, a second housing 130, a lever component 140 comprising a lever head 142 and one or more lever arms 146, and a latch 155. The first housing 120, the second housing 130, and the lever component 140 may each be made of a material such as a plastic, composite, or other material. In the depicted embodiment, the first housing 120, the second housing 130, and the lever component 140 are each comprised of a plastic (e.g., thermoplastic), metal (e.g., copper alloy), and/or any other suitable material.

The second housing 130 may be structured to mate with the first housing 120. In some embodiments, the second housing 130 may house components that are electrically coupled to components in the first housing 120 as described herein with reference to FIGS. 5A and 5B. In some example embodiments, the second housing 120 may be made from a plastic (e.g., thermoplastic), metal (e.g., copper alloy), and/ or any other suitable material like, or different from, the material included in the first housing 120 or a combination thereof.

Figure 3A:
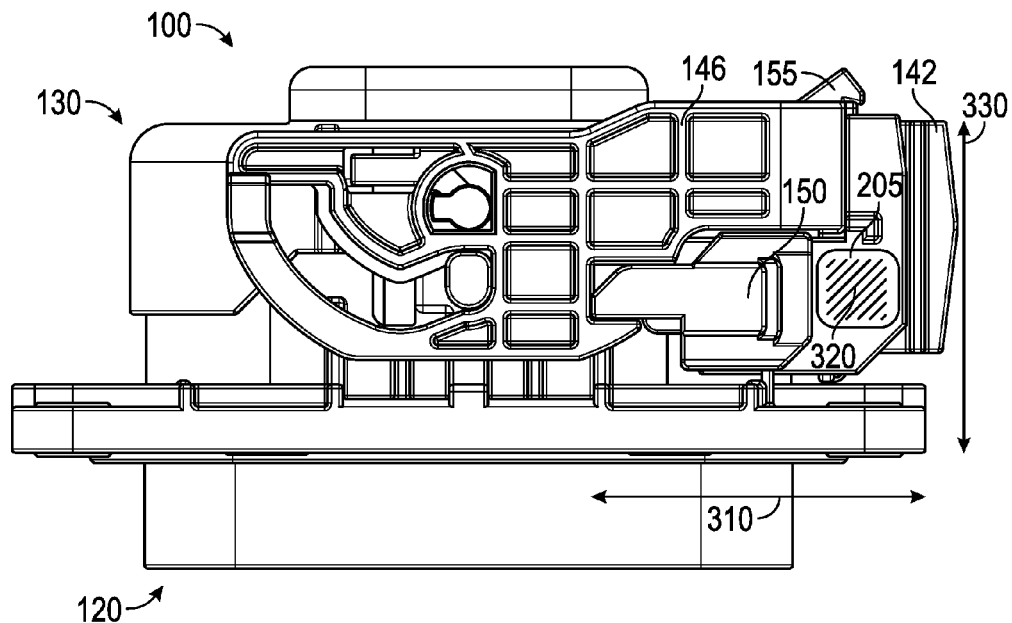
FIG. 3A illustrates a side perspective view of a connector assembly in a second position according to an example embodiment.
Figure 3B:
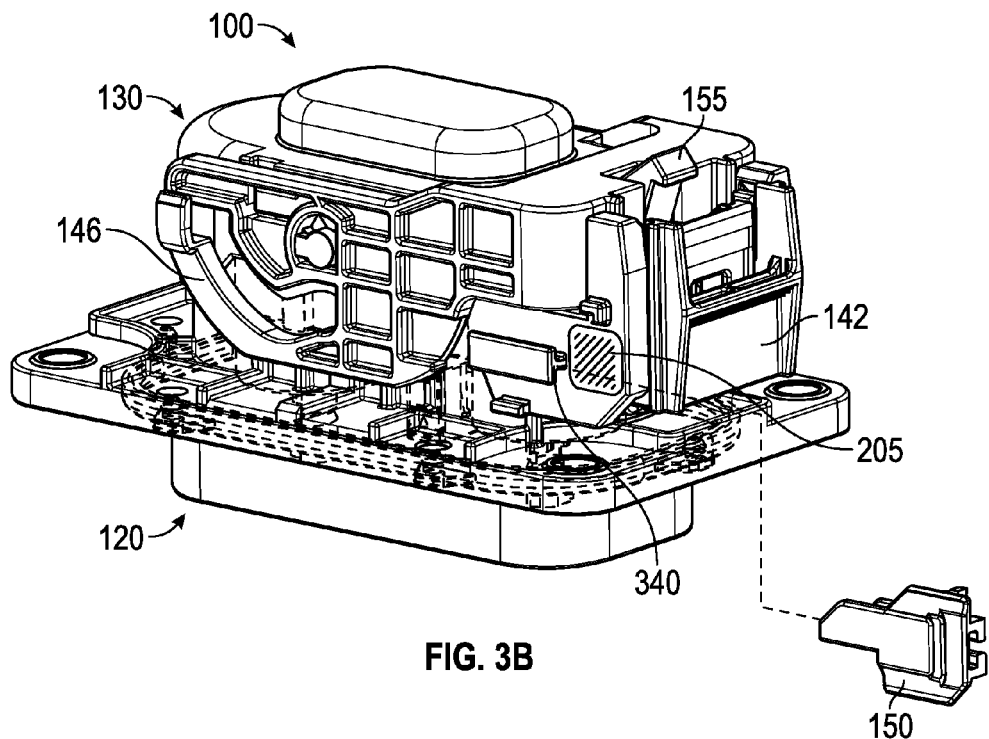
FIG. 3B illustrates a front perspective view of a connector assembly according to an example embodiment.
Figure 4:
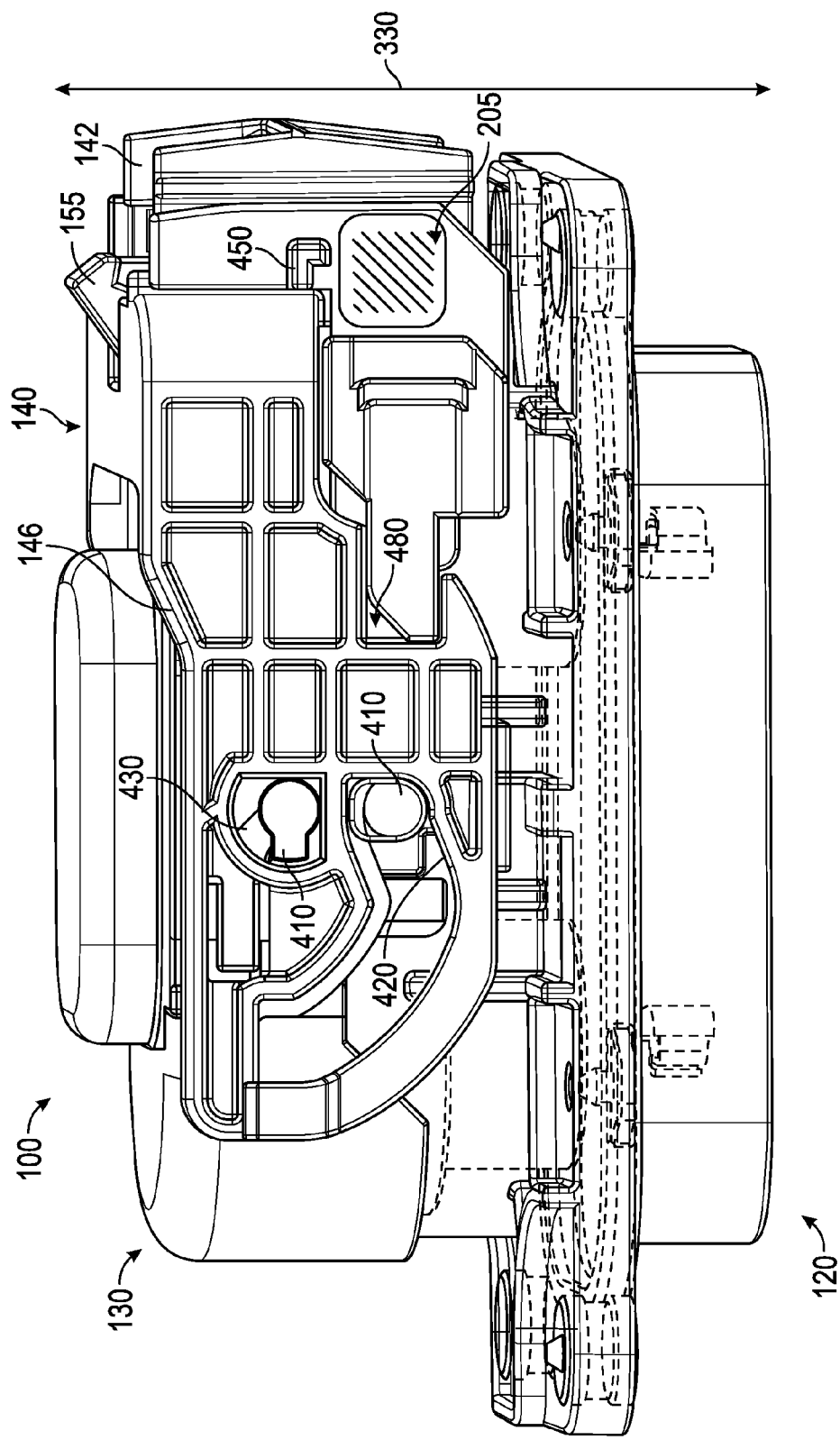
FIG. 4 illustrates a side perspective view of a connector assembly according to an example embodiment.

The connector assembly 100 as illustrated may include the lever component 140. In some embodiments, the lever component 140 may be coupled to the second housing 130. In other example embodiments, the lever component 140 may be coupled to the first housing 120. As depicted, the lever component 140 comprises a lever head 142 and one or more lever arms 146. The lever component 140 may be operable, via the one or more lever arms 146, between the first position 160 and the second position 330 (as depicted in FIGS. 3A and 4). In this regard, the lever component 140 may be configured to mate the first housing 120 with the second housing 130 as described herein with reference to FIGS. 1, 2, 3A, 3B, and 6.

In some embodiments, the connector assembly 100 includes a position assurance lock 150 structured to secure the mating of two or more housings 120, 130 to otherwise prevent motion or disconnection of each respective housing. The position assurance lock 150 may comprise a latch or other motion prevention device. The position assurance lock 150 may be coupled to the second housing 130 as depicted. For example, the position assurance lock 150 may be mounted onto the second housing 130. Alternatively or additionally, the position assurance lock 150 may be coupled to the first housing 120. In some embodiments, the position assurance lock 150 is configured to secure the first housing 120 to the second housing 130. For example, the position assurance lock 150 may ensure the connector assembly 100 is fully mated by securing (e.g., locking) the first housing 120 and the second housing 130.

In further embodiments, the position assurance lock 150 is configured to place a machine readable identifier in a first state or a second state. For example, the position assurance lock 150 may be configured to place the machine readable identifier in an inaccessible state or an accessible state, depending on whether the first housing 120 is secured to the second housing 130 as described herein below. In some embodiments, the position assurance lock 150 may be injection molded.

Figure 2:
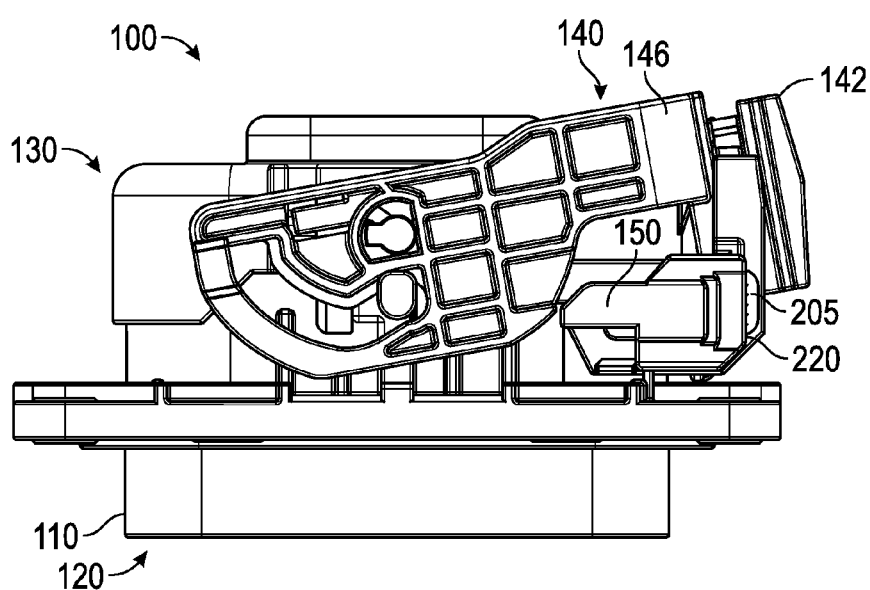
FIG. 2 illustrates a side perspective view of a connector assembly according to an example embodiment.

In some embodiments, the connector assembly 100 includes a machine readable identifier 205 as depicted in FIG. 2. The machine readable identifier 205 may include a machine readable optical identifier, such as a barcode (e.g., a single or multi-dimensional barcode), quick response (QR) code, or any other machine-readable optical label. In other embodiments, the machine readable identifier may be a tag (e.g., radio frequency identification (RFID) tag). In some example embodiments, the machine readable identifier 205 may be color coded, laser etched, embossed, engraved, painted, or applied in any form that may facilitate visual or any other sensual recognition. In one embodiment, the machine readable identifier 205 measures 10 mm (millimeters)×10 mm. In other embodiments, the machine readable identifier 205 may have other suitable dimensions. The machine readable identifier 205 may be provided on the second housing 130. In some example embodiments, the machine readable identifier 205 may be coupled to the second housing 130 via one or more fasteners (e.g., one or more adhesives, screws, etc.). In other example embodiments, the machine readable identifier 205 may be embedded within the second housing 130. As depicted in FIG. 2, the machine readable identifier 205 is in an inaccessible state 220. In the inaccessible state 220, the machine readable identifier 205 may be covered, hidden, blocked, or otherwise obstructed from view, or otherwise placed in a state in which is different depending on whether the first housing 120 is secured to the second housing 130. Further description of the machine readable identifier is discussed herein in detail below.

With reference to FIG. 3A, a side perspective view of a connector assembly 100 in a second position 330 is illustrated according to an example embodiment. The position assurance lock 150 may be configured for operation between a disengaged position (e.g., an unlocked or otherwise unsecure position) and an engaged position (e.g., a locked or otherwise secure position) along the direction 310. In this regard, the second housing 130 may further include an assurance protrusion 340 structured to support the position assurance lock 150 as depicted in FIG. 3B. Alternatively or additionally, the position assurance lock 150 may be operable, via the assurance protrusion 340, along the direction 310. For example, the position assurance lock 150 may be slidable along the assurance protrusion 340 in the direction 310 between the disengaged position and the engaged position.

In some embodiments, the position assurance lock 150 may be configured to switch the machine readable identifier 205 between an inaccessible state 220 (e.g., a covered state as described herein with reference to FIG. 2) and an accessible state 320. In the accessible state 320, the machine readable identifier 205 may be read, scanned, revealed, or otherwise accessed and/or viewed. The position assurance lock 150 may be configured to switch the machine readable identifier 205 between the inaccessible state 220 and the accessible state 320 in response to the position assurance lock 150 becoming actuated by the lever component 140. For example, the lever component 140 may actuate the position assurance lock 150 to move from the disengaged state to the engaged state along direction 310. In turn, as the position assurance lock 150 moves along the direction 310, the machine readable identifier 205 is switched between the inaccessible state 220 and the accessible state 320.

Figure 5A:
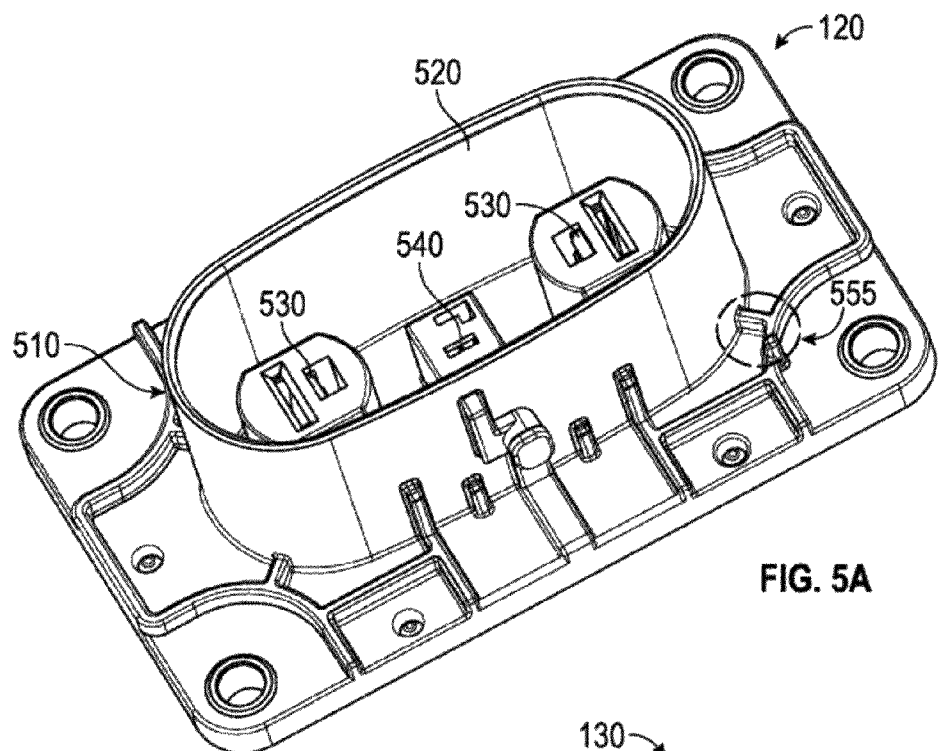
FIG. 5A illustrates an inner view of a first housing of a connector assembly according to an example embodiment.

The connector assembly 100 as illustrated may include a latch 155 configured to at least one of retain the lever component 140 in a second position 330 or release the lever component 140 to return to the first position 160. In some embodiments, when the connector assembly 100 approaches the engaged position, the raised portion 555 (as illustrated in FIG. 5A) interacts with the lever component 140 to actuate the position assurance lock 150 between the disengaged position and the engaged position. In turn, the latch 155 retains the lever component 140 in the second position 330 or releases the lever component 140 to return to the first position 160. While in, for example, the engaged position, the position assurance lock 150 may indicate to the operator that the first housing 120 and the second housing 130 are secure (e.g., properly mated) as the position assurance lock moves along the direction 310 switching the machine readable identifier 205 between the inaccessible state 220 and the accessible state 320.

With reference to FIG. 4, a side perspective view of a connector assembly 100 is illustrated according to an example embodiment. As depicted, the second housing 130 may include a plurality of pivoting protrusions 410. The plurality of pivoting protrusions 410 may be structured to extend from the second housing 130. To that end, the lever component 140 may be coupled, via the plurality of pivoting protrusions 410, to the second housing 130. Although as depicted, the plurality of pivoting protrusions 410 extend from the second housing 130, the plurality of pivoting protrusions may extend from the first housing 120.

In some embodiments, the lever component 140 may be structured to define a plurality of protrusion receiving cavities 420, 430. The plurality of protrusion receiving cavities 420, 430 may be configured for operation about the plurality of pivoting protrusions 410. To that end, the lever component 140 may be configured to mate the first housing 120 and the second housing 130 in response to a motion (e.g., a pivoting motion, touch, or other force applied). For example, the first housing 120 may be mated with the second housing 130 in response to a pivoting motion provided to the lever component 140 about the plurality of pivoting protrusions 410. The pivoting motion may be actuated in response to an operator moving the lever head 142 from the first position 160 (as depicted in FIG. 1) to the second position 330 (as depicted in FIGS. 3A and 4). Alternatively or additionally, the pivoting motion may be actuated in response to a mechanical operation and/or an electrical operation configured to move the lever head 142 from the first position 160 to the second position 330.

In further embodiments the second housing 130 may include a securing protrusion 450. The securing protrusion 450 may be structured to maintain the position of the position assurance lock 150 with respect to the assurance protrusion 340 (as illustrated with reference to FIG. 3B). For example, the securing protrusion 450 may be structured to prevent (e.g., stop, inhibit, etc.) the position assurance lock 150 from extending beyond the assurance protrusion 340, thereby, maintaining the position assurance lock 150 along the assurance protrusion 340.

In some example embodiments, the lever arm 146 may be structured to define a receiving pocket 480. The receiving pocket 480 may be structured to maintain the position of the position assurance lock 150 while the position assurance lock 150 is in the engaged position. For example, the receiving pocket 480 may be structured to receive the position assurance lock 150 to prevent (e.g., stop or inhibit) the position assurance lock 150 from moving from the engaged position to the disengaged position.

With reference to FIG. 5A, an interior view of a first housing 120 of a connector assembly 100 is illustrated according to an example embodiment. The first housing 120 comprises a first inner housing 510 which may be structured to facilitate the mating of the second inner housing 550 (as described with reference to FIG. 5B) with the first inner housing 510. To that end, the first housing 120 may be structured to define a receiving cavity 520. The receiving cavity 520 may be configured to facilitate the mating of the second inner housing 550 with the first inner housing 510. The first housing 120 may be configured to surround, via the receiving cavity 520, at least a portion of the second housing 130 comprising the second inner housing 550. Accordingly, the first inner housing 510 may be structured to mate (e.g., form a male connection) with the second inner housing 550. For example, the first inner housing 510 may be structured to form a male connection (e.g. a connection by which components, features, etc. of the first inner housing are provided to a secondary inner housing). In other example embodiments, the first inner housing 510 may be structured to form a female connection with the second inner housing 550. For example, the first inner housing 510 may be structured to form a female connection (e.g. a connection by which components, features, etc. of the first inner housing receives corresponding components, features, etc. provided by a secondary inner housing).

In some embodiments, the first inner housing 510 comprises one or more circuits, terminals, sockets, and/or other electrical components. Alternatively or additionally, the receiving cavity 520 may comprise the one or more circuits, electrical terminals 530, 540 (e.g., female terminals), sockets, and/or other electrical components. In embodiments, rather than being a connector assembly for electrical components, the connector assembly 100 is a connector assembly for fluids (e.g., oil, water, natural gas, etc.).

Figure 5B:
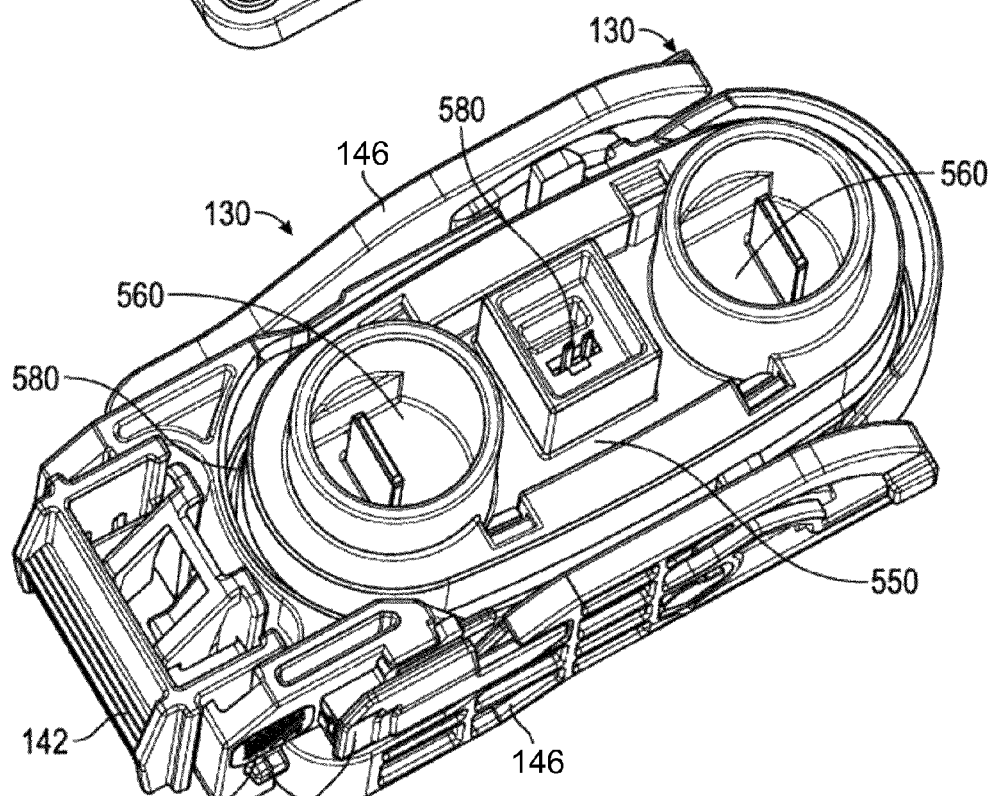
FIG. 5B illustrates an inner view of a second housing of a connector assembly according to an example embodiment.

FIG. 5B illustrates an inner view of a second housing 130 of a connector assembly 100 according to an example embodiment. As depicted, the second housing 130 comprises a second inner housing 550. The second inner housing 550 may comprise at least one of one or more fuses or shunts. In some example embodiments, the second inner housing 550 may comprise one or more pins 580. In other example embodiments, the second inner housing 550 may be structured to define one or more connection cavities 560. The one or more connection cavities 560 may be configured to facilitate the mating of the terminals 530 and the second inner housing 550 with the first inner housing 510. For example, the one or more connection cavities 560 may be configured to receive the one or more terminals 530, thereby, establishing and/or facilitating an electrical connection between the first housing 120 and the second housing 130.

Figure 6:
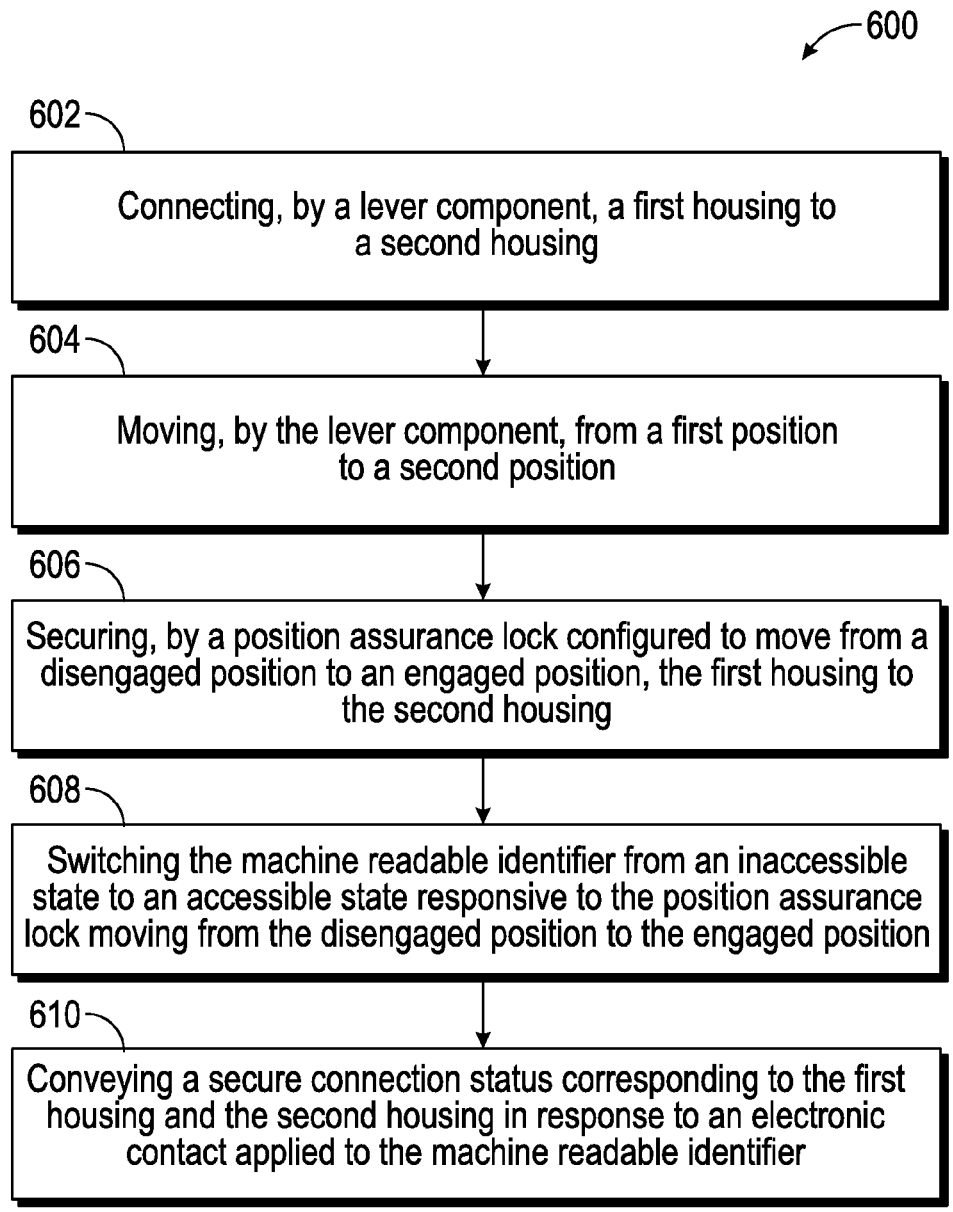
FIG. 6 illustrates a flowchart of a method of determining a secure connection status corresponding to a connector assembly according to one embodiment.

Referring now to FIG. 6, a flowchart of a method of conveying a secure connection status corresponding to a connector assembly is shown, according to one embodiment. The processes shown in FIG. 6 are performed by the connector assembly 100 as the connector assembly 100 is being installed. At process 602, a first housing and a second housing are connected via a lever component. Accordingly, the lever component may be operable between a first position (e.g., a vertical position) and a second position (e.g., a horizontal position). In this regard, the lever component 140 may be configured to mate the first housing 120 with the second housing 130.

At process 604, the lever component moves from a first position to a second position. For example, the lever component rotates (e.g., to the horizontal position) to mate (e.g., connect) the first housing and the second housing.

At process 606, the first housing is secured, via a position assurance lock configured to move from a disengaged position to an engaged position, to the second housing. The first housing may be secured to the second housing responsive to the lever component moving from the first position to the second position. In this regard, the position assurance lock may become actuated as the lever component moves from the first position to the second position. Interaction between a boss and flexible finger (not shown) facilitates the movement of the position assurance lock from each respective position. For example, an engaging force (e.g., a pushing force) actuates interaction between the boss and the flexible finger to facilitate the movement of the position assurance lock from the disengaged position to the engaged position. Alternatively or additionally, the position assurance lock may become actuated as the lever component moves from the second position to the first position. For example, the position assurance lock may be configured to move from an engaged position (e.g., a locked, secured, fully mated position, etc.) to a disengaged position (e.g., an unsecured, unlocked, disconnected position, etc.). To that end, a disengaging force (e.g., a pulling force) actuates (e.g., flexes) the flexible finger to facilitate the movement of the position assurance lock from the engaged position to the disengaged position.

At process 608, the machine readable identifier switches from a first state to a second state responsive to the position assurance lock moving from the disengaged position to the engaged position. In some embodiments, the lever component may actuate the position assurance lock to move from the disengaged state to the engaged state along a direction. In turn, as the position assurance lock moves along the direction, the machine readable identifier is switched between the inaccessible state and the accessible state as described herein.

At process 610, a secure connection status corresponding to the first housing and the second housing is conveyed by the connector assembly 100 in response to an electronic contact applied to the machine readable identifier. The machine readable identifier may include a barcode (e.g., a single or multi-dimensional barcode), quick response (QR) code, any machine-readable optical label, or other identifier. An electronic contact (e.g., an optical scan, an electronic read, etc.) may be applied to the machine readable identifier (e.g., the machine readable identifier in the accessible state). In some embodiments, the electronic contact applied to the machine readable identifier may be applied via at least one of an identifier device, an operator, sensor, or telematics. In turn, a secure connection status corresponding to the first housing and the second housing may be determined. In the accessible state corresponding to the machine readable identifier the secure connection status corresponding to the first housing and the second housing may be configured to be secure. In further embodiments, in the inaccessible state corresponding to the machine readable identifier, the secure connection status corresponding to the first housing and the second housing may be determined to be unsecure.

While this specification contains many specific embodiment details, these should not be construed as limitations on the scope of what may be claimed, but rather as descriptions of features specific to particular embodiments. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various exemplary embodiments is illustrative only and not restrictive in character. All changes and modifications that come within the spirit and/or scope of the described embodiments are desired to be protected. It should be understood that some features may not be necessary and embodiments lacking the various features may be contemplated as within the scope of the application, the scope being defined by the claims that follow. When the language "at least a portion" and/or "a portion" is used the item can include a portion and/or the entire item unless specifically stated to the contrary.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A connector assembly comprising:
   a first housing;
   a second housing;
   a machine readable identifier coupled to the second housing; and
   a position assurance lock disposed proximate to the second housing, the position assurance lock having an engaged position and a disengaged position, the position assurance lock configured to:
   secure the first housing to the second housing when the position assurance lock is in the engaged position; and
   place the machine readable identifier in a first state comprising an inaccessible state or a second state comprising an accessible state, depending on whether the first housing is secured to the second housing.

2. The connector assembly of claim 1, wherein the position assurance lock is configured to place the machine readable identifier in the first state or the second state responsive to the position assurance lock moving between the disengaged position and the engaged position.

3. The connector assembly of claim 2, wherein the position assurance lock is configured to place the machine readable identifier in the first state or the second state in response to a lever component, wherein the lever component is configured to interact with a raised portion of the first housing to actuate the position assurance lock between the disengaged position and the engaged position, and wherein the lever component is coupled to at least one of the first housing or the second housing.

4. The connector assembly of claim 1, wherein the second housing further comprises a plurality of pivoting protrusions extending from the second housing, and wherein the lever component is coupled, via the plurality of pivoting protrusions, to the second housing, the lever component defining a plurality of protrusion receiving cavities configured to be operable about the plurality of pivoting protrusions.

5. The connector assembly of claim 4, wherein the lever component is configured to mate the first housing and the second housing in response to a pivoting motion about the plurality of pivoting protrusions.

6. The connector assembly of claim 1, further comprising a latch coupled to the second housing, the latch configured to at least one of retain the lever component in the second position or release the lever component to return to the first position, the lever component operable between the first position and the second position.

7. The connector assembly of claim 1, wherein the machine readable identifier comprises at least one of a barcode or tag.

8. The connector assembly of claim 1, wherein the first housing comprises a first inner housing comprising at least one of one or more circuits, one or more terminals, sockets, or electrical components.

9. The connector assembly of claim 8, wherein the second housing comprises a second inner housing comprising at least one of one or more fuses or one or more shunts.

10. The connector assembly of claim 9, wherein the first housing is structured to define a receiving cavity configured to facilitate the mating of the second inner housing with the first inner housing.

11. A method of conveying a secure connection status corresponding to a connector assembly, the method comprising:

connecting, by a lever component moving from a first position to a second position, a first housing to a second housing;

securing, by a position assurance lock configured to move from a disengaged position to an engaged position, the first housing to the second housing;

switching the machine readable identifier from an inaccessible state to an accessible state responsive to the position assurance lock moving from the disengaged position to the engaged position; and conveying a secure connection status corresponding to the first housing and the second housing in response to an electronic contact applied to the machine readable identifier.

12. The method of claim 11, wherein the electronic contact applied to the machine readable identifier is applied via at least one of an identifier device, an operator, sensor, or telematics.

13. The method of claim 11, wherein in the accessible state corresponding to the machine readable identifier the secure connection status corresponding to the first housing and the second housing is configured to be secure.

14. The method of claim 11, wherein the secure connection status is determined to be secure in response to an electronic contact applied to the machine readable identifier.

15. The method of claim 11, wherein in the inaccessible state corresponding to the machine readable identifier, the secure connection status corresponding to the first housing and the second housing is conveyed to be unsecure.

16. The method of claim 11, wherein the electronic contact comprises at least one of an optical scan or an electronic read.

17. The method of claim 11, wherein the machine readable identifier comprises at least one of a barcode or tag.

18. The method of claim 11, wherein the lever component is coupled to at least one of the first housing or the second housing.

19. A connector assembly comprising:
   a first housing comprising a first inner housing, the first housing configured to surround at least a portion of a second housing comprising a second inner housing, wherein the first housing is structured to define a receiving cavity configured to facilitate the mating of the second inner housing with the first inner housing;
   a lever component coupled to the second housing, the lever component configured to:
      move in a pivoting motion; and
      move from a first position to a second position in response to the pivoting motion;
   a machine readable identifier coupled to the second housing; and
   a position assurance lock coupled to the second housing, the position assurance lock configured to:
      secure the first housing to the second housing in response to the lever component moving from the first position to the second position; and
      move the machine readable identifier between an inaccessible state and an accessible state in response to the securing of the first housing to the second housing.

20. The connector assembly of claim 19, wherein in the accessible state corresponding to the machine readable identifier the first housing and the second housing is configured to be secure.

* * * * *